United States Patent [19]

Grant

[11] 4,301,216
[45] Nov. 17, 1981

[54] NYLON/SAN LAMINATES

[75] Inventor: Thomas S. Grant, Vienna, W. Va.

[73] Assignee: Borg-Warner Chemicals, Inc., Parkersburg, W. Va.

[21] Appl. No.: 70,090

[22] Filed: Aug. 27, 1979

[51] Int. Cl.³ .............................................. B32B 27/34
[52] U.S. Cl. ............................... 428/476.3; 428/475.8; 428/315
[58] Field of Search ..................... 428/475.8, 520, 522, 428/476.3, 310, 315; 526/272, 317, 303; 264/176 R

[56] References Cited

U.S. PATENT DOCUMENTS

| | | | |
|---|---|---|---|
| 2,439,227 | 4/1948 | Seymour et al. | 526/272 |
| 2,531,408 | 11/1950 | D'Alelio | 526/317 |
| 2,767,153 | 10/1956 | Sutton . | |
| 3,423,231 | 1/1969 | Lutzmann . | |
| 3,668,274 | 6/1972 | Owens et al. . | |
| 3,697,368 | 10/1972 | Bhuta et al. . | |
| 3,725,174 | 4/1973 | Gaylord | 428/520 |
| 3,746,609 | 7/1973 | Stange et al. | 428/475.8 |
| 3,766,151 | 10/1973 | Huang et al. . | |
| 3,796,771 | 3/1974 | Owens et al. . | |
| 3,963,799 | 6/1976 | Starkweather, Jr. . | |
| 3,971,865 | 7/1976 | Murakami et al. | 428/40 |
| 3,974,234 | 8/1976 | Brinkmann et al. . | |
| 3,984,497 | 10/1976 | Owens et al. . | |
| 3,998,991 | 12/1976 | Kaas | 428/520 |
| 4,015,033 | 3/1977 | Nield | 428/522 |
| 4,233,367 | 11/1980 | Ticknor | 428/476.3 |

FOREIGN PATENT DOCUMENTS

| | | | |
|---|---|---|---|
| 50-4167 | 5/1975 | Japan | 428/475.8 |
| 52-25845 | 1/1977 | Japan | 428/476.3 |
| 52-57276 | 5/1977 | Japan | 428/475.2 |
| 54-113678 | 10/1979 | Japan | 428/520 |
| 7906122 | 2/1980 | Netherlands | 428/476.3 |

OTHER PUBLICATIONS

Ide et al., Journal of Applied Polymer Science, Studies on Polymer Blend of Nylon 6 and Polypropylene or Nylon 6 and Polystyrene, vol. 18, pp. 963–974 (1974).

*Primary Examiner*—Stanley S. Silverman
*Attorney, Agent, or Firm*—Richard J. Schlott

[57] ABSTRACT

Multi-layered composites and laminates comprising a layer of a polyamide resin and a layer of a carboxylated SAN copolymer resin. The composites and laminates exhibit excellent interlayer adhesion and are thermoformable.

3 Claims, 4 Drawing Figures

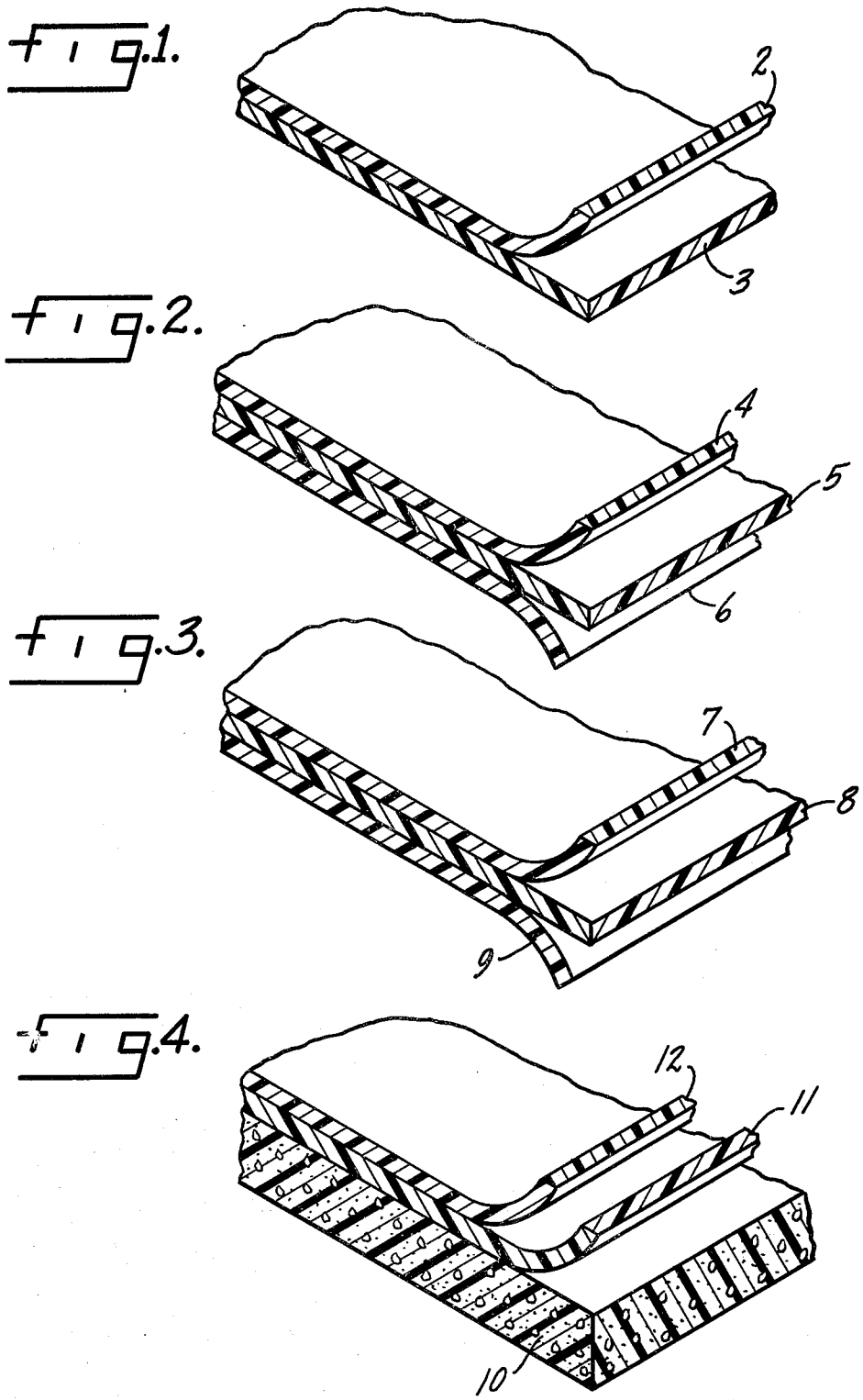

NYLON/SAN LAMINATES

BACKGROUND OF THE INVENTION

This invention relates to laminates and more particularly to laminates comprising polyamides and copolymers of styrene with acrylonitrile and to methods for their preparation.

Styrene-acrylonitrile (SAN) copolymer resins, including rubber-modified SAN resins and acrylonitrile-styrene-butadiene (ABS) graft resins, are widely employed in the form of extruded sheet material for manufacturing thermo-formed appliance housings, automotive panels, camper tops, boat hulls and the like. For many applications a co-extruded structural foam sheet having a core of foamed material and a smooth outer skin, usually formed from rubber-modified SAN copolymer resin, is employed. Whether in solid or foam-core sheet, SAN resins are widely accepted for a variety of applications where ease of thermo-forming, rigidity, toughness, good impact strength and good surface appearance and gloss are important considerations.

Although SAN resins have a highly desirable surface appearance and excellent resistance to staining, the surfaces withstand abrasion rather poorly, are subject to stress-crazing and chemical attack by hydrocarbon fuels, and are subject to severe deterioration on exposure to UV radiation. In end-uses where weatherability is an important factor, rubber-modified SAN resins must be protected either by means of effective stabilizers or by coating the exposed surfaces with acrylic sheet or other protective material. Alternative methods for modifying the surfaces with protective materials, though most frequently carried out for decorative purposes, include plating and painting. Both methods require that the surface of the SAN copolymer resin be treated in some manner to effect adhesion of the plating or paint coating. Further, the application of paint frequently results in deterioration of the mechanical properties, particularly the impact properties, of rubber-modified SAN sheet material.

The weatherability and environmental resistance of SAN copolymer resins may also be modified by forming blends with other resins to achieve a compromise balance of properties together with improved wear and resistance to chemical attack. For example, blends of ABS with nylon or with PVC are known to have high impact properties and good environmental resistance. These improvements may be gained at the expense of other highly desirable properties of SAN resins such as ease of thermoforming, and may result in substantial changes in such properties as flexural modulus and tensile strength.

Composites or laminates comprising two or more resin layers provide structures with altered surface characteristics without a significant change in the inherent mechanical properties of the individual components. As described herein above, a laminate comprising SAN copolymer resin base sheet and a thin acrylic cap sheet effectively resists exposure to UV radiation and weathering. The mechanical properties of the laminate are substantially those of the SAN base sheet, while the thin acrylic sheet provides surface protection and weatherability equivalent to that of acrylic sheet alone.

In principle, SAN base sheet could be provided with a tough, abrasion resistant surface by laminating the SAN sheet with a surface layer of a polyamide. Similarly, where excellent stain resistance and surface gloss and appearance are required, a polyamide base sheet could in principle be provided with a surface layer of SAN. In practice, laminates and composities of conventional polyamides and conventional SAN copolymer resins cannot be made due to the lack of adhesion between such dissimilar resins. Laminates formed of conventional SAN copolymers and polyamides literally fall apart, and hence are useless for nearly all applications.

Tightly-adhered composites of SAN copolymers and polyamides would provide structures having highly useful mechanical properties and desirable surface characteristics which would find extended utility over either resin alone.

SUMMARY OF THE INVENTION

The present invention consists of a multi-layered composite comprising a layer of SAN copolymer resin and a layer of a polyamide resin. More particularly, the present invention consists of a laminate comprising a layer of a carboxylated SAN copolymer resin and one or more layers of a polyamide resin. The laminate may further comprise one or more layers of an SAN resin adhered to the carboxylated SAN resin. The resulting laminate is thermoformable.

BRIEF DESCRIPTION OF THE DRAWINGS

FIG. 1 shows a partial cross-sectional view of a composite in accordance with this invention.

FIG. 2 shows a partial cross-sectional view of a multi-layered composite in accordance with an alternative embodiment of this invention.

FIG. 3 shows a partial cross-sectional view of a multi-layered composite in accordance with a second alternative embodiment of this invention.

FIG. 4 shows a partial cross-sectional view of a multi-layered, foam core composite in accordance with a third alternative embodiment of this invention.

DETAILED DESCRIPTION OF THE INVENTION

The polyamides useful for the purposes of this invention are linear synthetic high molecular weight polymers produced by the polycondensation reaction of a diamine and a dicarboxylic acid, the polycondensation reaction of an amino acid or the ring-opening polymerization of a lactam. Typical polyamides include polycaprolactam [nylon 6], poly(hexamethylene adipamide) [nylon 6, 6], poly(11-undecanoamide) [nylon 11], and the like, as well as copolymers and mixtures thereof.

The carboxylated SAN copolymers useful for the purpose of this invention include carboxylated copolymers of styrene and acrylonitrile (SAN), carboxylated terpolymers of styrene, acrylonitrile and one or more copolymerizable monomers such as alpha methylstyrene, alkyl acrylates, alkyl methacrylates and vinyl toluene, and carboxylated graft polymers formed by graft polymerizing styrene, acrylonitrile and, optionally, one or more copolymerizable monomers such as alpha methylstyrene, vinyl toluene, alkyl acrylates and alkylmethacrylates in the presence of a rubbery substrate polymer of isoprene, butadiene, a copolymer thereof with styrene, or an acrylate rubber. The carboxylation is accomplished by including from 0.5 to 10 wt. %, based on final polymer, of a copolymerizable carboxylic acid compound such as itaconic acid, citraconic acid, maleic anhydride, acrylic acid, acrylamide, or the like. High levels of the carboxylic acid monomer detrimentally affect the processability and physical properties of the SAN copolymer, while at levels below about 0.5% modifier, little effect on adhesion is seen. In general, levels of from about 1 wt. % to about 5 wt. % and more preferably from about 1 wt. % to about 2 wt. % are sufficient to provide adequate adhesion without significantly affecting the mechanical properties of the SAN copolymer.

In the preferred embodiment, the carboxylic acid modified SAN copolymer will be a copolymer containing from about 1 to about 5 wt. % copolymerizable carboxylic acid compound. The styrene and acrylonitrile components will be present in a ratio of from about 4:1 to about 1:4, depending upon the particular end-use envisioned. The carboxylated SAN copolymer may be employed directly to prepare the laminate, or may be blended with up to 50 wt. % of a compatible elastomer such as for example, an acrylic ester rubber, or a graft copolymer of styrene and acrylonitrile (ABS) containing from 10 to 50 wt. % of styrene, acrylonitrile and optionally a third copolymerizable monomer such as an acrylic ester or alpha methylstyrene graft polymerized onto correspondingly from 90 to 50 wt. % of a substrate butadiene, styrene-butadiene or acrylic ester rubber. Where the carboxylated SAN copolymer is blended with an elastomeric component, the level of carboxylic compound contained in the rubber modified SAN copolymer will be selected to provide from about 1 to about 5 wt. % modifier in the final blend.

As is well established in the art, polyamides and SAN copolymers or ABS resins may be blended. However, when laminates of these two dissimilar resins are formed, the adhesion between the layers is very low, and the layers may be readily separated; in some circumstances, the layers literally fall apart. In the present invention, a carboxylated SAN copolymer is employed to form the layer contacting the polyamide. The adhesion between the layers is excellent and separation of the layers does not occur. The carboxylated SAN copolymer also adheres well to conventional SAN copolymers, and may be employed as an interlayer between a layer of SAN copolymer or ABS graft polymer and a layer of polyamide to provide a three component laminate having excellent interlayer adhesion.

The laminates of this invention may be formed by any of a variety of conventional processing methods. The various polymers may each be extruded into sheet and the sheet materials brought together under pressure while in a plastic condition to achieve adhesion. Alternatively, the preformed sheet materials may be layed over each other and heated under pressure to adhere the layers. A third method would involve the use of multiple opening co-extrusion dies wherein two or more resins are plasticated in separate extruders and fed to the die simultaneously to form the individual sheets which then are united either within the die or as they leave the multi-opening die. Appropriate designs of extruder heads are well-known in the fabricating art, and adaptations capable of extruding multi-layered sheet, foam core sheet and the like are readily available. Multi-layered co-extrusion tubing dies may also be employed to produce pipe and tubing having composite walls formed of layers of SAN copolymer resin and polyamide. Co-extrusion technology has also been applied to injection molding, wherein composite molded articles having a core formed of one resin and an outer layer formed of a second resin are produced, and co-injection molding may be employed to form composite molded articles having a core formed either of modified SAN or polyamide, surrounded by a tightly adhered shell of, correspondingly, polyamide or modified SAN.

The multi-layered laminates will be better understood by reference to the drawings.

In FIG. 1 there is shown a two-layer laminate comprising a layer of polyamide 2 adhered to a layer of carboxylated SAN copolymer 3.

In FIG. 2 there is shown an alternative embodiment having outer layers 4 and 6 formed of polyamide and an inner layer 5 formed of carboxylated SAN copolymer.

In FIG. 3 is shown a multi-layer laminate. In this alternative embodiment, a layer 7 of polyamide resin is adhered to a layer 8 formed of carboxylated SAN copolymer which in turn is adhered to a layer 9 formed of rubber-modified SAN copolymer or ABS sheet.

In the embodiments disclosed in FIGS. 1-3 the various layers of polyamide, SAN copolymer and carboxylated SAN copolymer are shown as being approximately equal in thickness. It will be understood that the overall thickness of the laminate as well as the relative thickness of the individual layers may be varied between wide limits depending upon the end-use envisioned. Where the end-use requires that the laminate be substantially an SAN resin sheet having a protective surface layer or layers of polyamide, the polyamide layer may be relatively very much less in thickness compared with that of the SAN polymer layer or layers. For some applications, the laminate may be formed of a multiplicity of extremely thin layers which together form a film or thin sheet.

It will also be apparent that a variety of composites and laminates can be produced according to the practice of this invention, and fillers, dyes, colorants, reinforcing fibers and the like may be incorporated into one or more of the polymeric layers. Thus, where high modulus, abrasion resistance and good impact are desired, a multi-layered laminate comprising a rubber-modified layer of SAN copolymer or ABS graft polymer sheet, a layer of carboxylated SAN copolymer sheet and a layer of glass-fiber filled polyamide sheet could be formed by co-extrusion which would provide a structural sheet having good impact and toughness provided by the rubber-modified SAN copolymer, high modulus and good abrasion resistance provided by the fiber-filled nylon layer and good interlayer adhesion provided by the modified SAN copolymer layers. Similarly, where it is desired to provide an abrasion resistant sheet having substantially the good mechanical properties of a rubber-modified SAN copolymer together with decorative, abrasion resistant surface, a multi-layer laminate comprising a rubber-modified SAN copolymer base layer, a surface layer formed of polyamide which is dyed or pigmented to accomplish the desired decorative result and optionally embossed or grained, and an interlayer formed of carboxylated SAN copolymer to provide good interlayer adhesion could readily be formed by multiple extrusion or co-extrusion followed by the application of an embossing roll to the polyamide surface.

As shown by FIG. 4, the instant invention also contemplates as an embodiment the formation of composites comprising a foamed SAN copolymer or ABS graft polymer layer 10, a carboxylated SAN layer 11 and a polyamide layer 12.

The practice of this invention and the highly advantageous mechanical properties of the laminates of this invention will become further apparent by consideration of the following illustrative examples:

PREPARATION OF CARBOXYLATED RESINS

Example 1

Carboxylated Styrene Acrylonitrile Copolymer

A polymerization reactor was charged with 180 g. of water containing 1.5 g. of sodium dodecyl benzene sulfonate surfactant. The reaction mixture was stirred and heated to 158° F., and the following solutions were fed to the reactor over a 100 minute period:

Solution 1. 73 g. styrene, 25 g. acrylonitrile, and 0.45 g. cumene hydroperoxide.
Solution 2. 20 g. of water and 2 g. of itaconic acid.
Solution 3. 7.34 g. of water, 0.30 g. of sodium formaldehyde sulfoxylate, 0.015 g. of ferrous sulfate heptahydrate and 0.045 g. of disodium salt of ethylene diamine tetracetic acid.

The reaction mixture was heated with stirring for two hours to give a latex of SAN copolymer resin having 2 wt. % itaconic acid modifier. The latex was salt-coagulated with aqueous calcium chloride, filtered, washed and dried at 60° C. in a circulating air oven.

Example 2

Carboxylated SAN Copolymer with Maleic Anhydride

A polymerization reactor was charged with 183.32 g. of water containing 1.5 g. of sodium dodecyl benzene sulfonate surfactant. The reaction mixture was stirred and heated to 158° F. and the following solutions were fed to the reactor over a 100 minute period:

Solution 1. 70 g. of styrene, 28 g. of acrylonitrile, 2 g. of maleic anhydride and 0.35 g. of t-dodecyl mecaptan.
Solution 2. 7.34 g. of water and 0.25 g. of potassium peroxysulfate.
Solution 3. 7.34 g. of water and 0.25 g. of sodium metabisulfite.

The reaction mixture was heated with stirring for an additional two hours to give an SAN copolymer latex containing 2 wt. % maleic anhydride. The latex was salt-coagulated and the resin was collected by filtration, washed and dried at 60° F. in a circulating air oven.

Example 3

A polymer reactor was charged with 100 g. of a polybutadiene latex (containing 25 g. polybutadiene solids), 51 g. of water and 1 g. of sodium dodecyl benzene sulfonate emulsifier. The reaction mixture was stirred and heated to 70° C. and the following solutions were fed to the reactor over a 100 minute period:

Solution 1. 20 g. of acrylonitrile, 54 g. of styrene, 1 g. of itaconic acid and 0.34 g. of cumene hydroperoxide.
Solution 2. 0.06 g. of tetrasodium pyrophosphate, 0.5 g. of dextrose, 0.002 g. of ferrous sulfate in 500 g. of water.

The reaction mixture was heated with stirring for two hours to give an ABS polymer latex having a 25% rubber component and 1% itaconic acid modifier. The latex was coagulated with calcium chloride, filtered, washed and dried at 60° C. in a circulating air oven.

Example 4

A blend consisting of 50 parts by weight of the modified SAN of Example 1, 25 parts by weight of a commercial ABS resin containing 50 wt. % butadiene rubber substrate and 25 parts by weight of an ABS containing 25 wt. % butadiene rubber substrate was prepared by blending the powdered resins, then extruding the powder blend and chopping the extrudate to provide pellets of a rubber-modified SAN containing 1 wt. % itaconic acid.

PREPARATION OF LAMINATES

Laminates were prepared for test purposes by plasticizing the carboxylated resin and the polyamide separately in extruders, and extruding them through a common sheeting die, producing a composite sheet having two or three plies including a 100 mil base fly of carboxylated resin and 10 to 15 mil plies of polyamide resin. The physical properties of representative laminates are set forth below in the following Table.

TABLE 1

| Ex No: | 5 | 6 | 7 | 8 | 9 |
|---|---|---|---|---|---|
| Carboxylated SAN Resin: | Ex 3 | Ex 3 | Ex 3 | Ex 4 | Ex 4 |
| Nylon 6: | None | One Side | Both Sides | None | One Side |
| Tabor Abrasion | | | | | |
| Nylon Side | — | 6.5 | 6.05 | — | 4.05 |
| ABS Side | 48.6 | 47.7 | — | 51.3 | |
| Tensile Str, psi | 5700 | 5875 | 5325 | 6200 | 5825 |
| Elongation % | 25 | 25 | 100 | 15 | 30 |
| Tensile Mod psi $\times 10^{-5}$ | 2.7 | 2.9 | 2.4 | 3.1 | 3.0 |
| HDT °F.[1] | | | | | |
| 264 psi | 193 | 193 | 198 | 187 | 187 |
| 66 psi | 211 | 207 | 209 | 207 | 204 |
| Flex Fatigue[2] Cycles/fail | 12,060 | — | <300,000 | — | — |

Notes:
[1] HDT = heat distortion temperature, °F., unannealed samples.
[2] Flex Fatigue = Rhunke slow speed flex fatigue, 3000 psi stress, 60 cycles/min.

The laminate of Example 9 was compared for adhesion with a control laminate prepared by co-extruding Nylon 6 ABS having no carboxylic acid modifier. In T-peel testing, the laminate of Example 9 required a 38 lb. pull to peel a 1" strip. The control laminate fell apart in the preparation of the test sample—no measurable adhesion existed.

ABS sheet having no protective coating and the laminate of Example 9 were exposed in a weatherometer according to the test methods set forth in ASTM D 1499-64. After 100 hours, the unprotected ABS control failed in flexural testing. The laminate of Example 9 passed the flexural test after 1000 hours of weatherometer exposure.

In warp tests, shells were vacuum-formed from 125 mil unmodified ABS sheet as controls, and from the laminate of Example 7. The shells were placed in circulating air ovens overnight, cooled and examined for warpage. The control shells were seriously warped after exposures of 260° F. The shells formed from the laminate sheet withstood exposures of 16 hours at 350° F. with little or no warpage or other distortion.

It will be apparent from these data that composite structures prepared from carboxylated San copolymer resins and polyamides exhibit useful properties not characteristic of component resins alone. Polyamides strongly adhere to the carboxylated SAN copolymer resins, forming composite structures with excellent mechanical properties, highly improved weathering characteristics and good resistance to surface abrasion. The composites exhibit an unexpected and outstanding improvement in flex fatigue behavior, and articles thermoformed from these composites are surprisingly resistant to warpage during heat cycling.

Example 10

SAN Copolymers with Acrylamide

A copolymer of SAN was prepared substantially according to the procedure of Example 2, but employing 10 wt. % acrylamide in place of the maleic anhydride, together with 70 wt. % styrene and 20 wt. % acrylonitrile. The product resin was blended with commercial ABS resin as in Example 4 to give a rubber-modified SAN copolymer resin containing 5 wt. % acrylamide. Co-extrusion with SAN-acrylamide resin base sheet and a 10 to 15 mil polyamide layer. The interlayer adhesion was fair. A control composite of conventional ABS and nylon 6 fell apart after extrusion, demonstrating that no significant interlayer adhesion occurs between unmodified SAN copolymer resin and polyamides.

Example 11

Composites with Foam-core Sheet

A co-extruded ABS foam-core sheet, 500 mil in thickness, was solvent-welded with methylene chloride by conventional techniques to the carboxylated SAN copolymer face of the laminate of Example 9 to provide a multi-layered composite comprising ABS foam-core sheet, carboxylated rubber-modified San interlayer and a tightly adhered surface sheet of nylon 6 polyamide. It will be apparent to those skilled in the art that multi-layer composites could be obtained through co-extrusion, employing a plurality of extruders to plasticate the individual resins, then passing the various resins to a common sheeting die and extruding the multi-layered composite as a sheet material.

The instant invention may thus be described as a composite structure comprising a layer of a polyamide resin and a layer of an SAN copolymer resin, the SAN copolymer resin having included therein foam about 0.5 to about 10 wt. % of a copolymerizable carboxylic acid compound, and a method for improving the interlayer adhesion of polyamides and SAN copolymer resins comprising including a copolymerizable carboxylic acid compound in the SAN copolymer resin component. As set forth herein above, the term SAN copolymer resin is defined to include styrene-acrylonitrile copolymers; terpolymers of styrene, acrylonitrile and one or more copolymerizable monomers such as alpha methylstyrene, a halostyrene, vinyl toluene, alkyl acrylates and alkyl methacrylates; and graft polymers formed by graft copolymerizing styrene, acrylonitrile and, optionally, one or more copolymerizable monomers such as alphamethylstyrene, a halostyrene, vinyl toluene, alkyl acrylates and alkyl methacrylates, in the presence of a rubbery substrate polymer of isoprene, butadiene, a copolymer of butadiene with styrene, or an acrylate rubber. The SAN copolymer may be employed directly to form the composite, or may be blended with a compatible elastomeric component.

Further modifications and variations of the teachings of this invention, which will be apparent to those skilled in the art, may be made without departing from the spirit and scope of the invention, which is defined solely by the appended claims.

I claim:

1. A composite structure comprising a layer of polyamide adjacent to and bonded to a layer of SAN copolymer resin, said SAN copolymer resin being copolymerized with from about 0.5 to about 5 wt. % of a compound selected from the group consisting of itaconic acid, citraconic acid, acrylic acid, maleic acid, maleic anhydride and acrylamide.

2. A composite structure comprising a layer of polyamide adjacent and bonded to a layer of SAN copolymer resin, said SAN copolymer resin being copolymerized with from 100 to 50 parts by weight of a copolymer of styrene, acrylonitrile and from 0.5 to 5 wt. % of a compound selected from the group consisting of itaconic acid, maleic anhydride and acrylamide and from 0 to 50 parts by weight of a compatible elastomer.

3. The composite structure of claim 2 wherein said styrene, said acrylonitrile and said compound are graft copolymerized in the presence of an elastomer.

* * * * *